No. 792,740. PATENTED JUNE 20, 1905.
P. N. STAFF.
PIPE COUPLING.
APPLICATION FILED JULY 26, 1904.
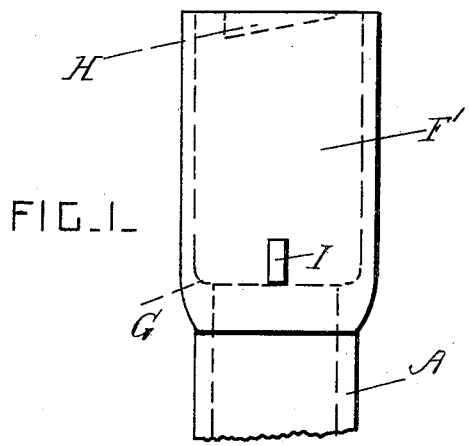
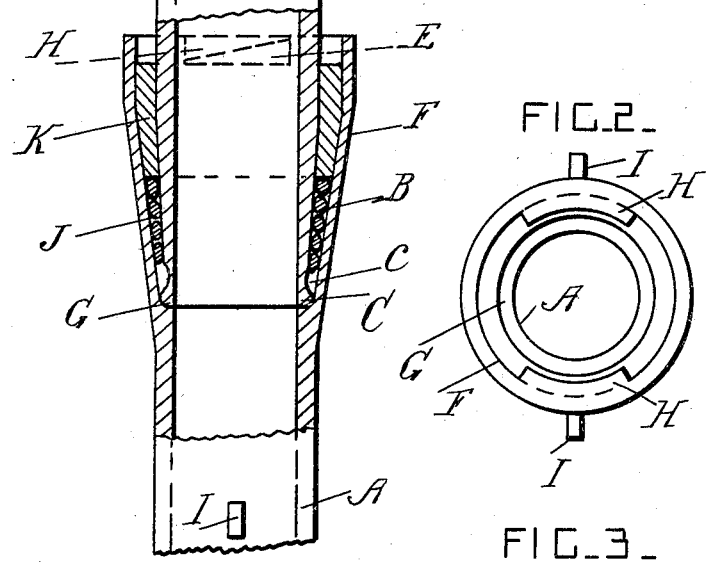
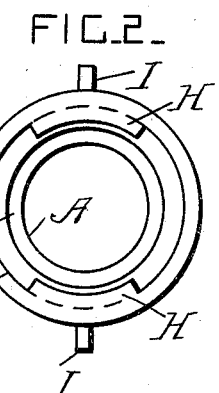
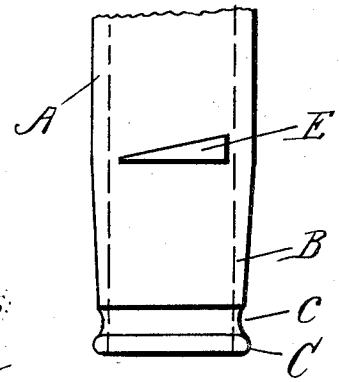
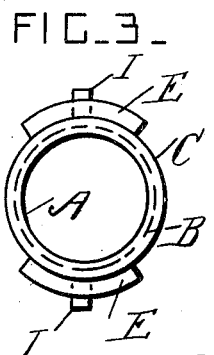
WITNESSES:
E. H. Hardy
Wm H. Bates
INVENTOR
Peter N. Staff
BY Herbert W. Jenner.
Attorney No. 792,740. Patented June 20, 1905.

UNITED STATES PATENT OFFICE.

PETER N. STAFF, OF TERRE HAUTE, INDIANA.

PIPE-COUPLING.

SPECIFICATION forming part of Letters Patent No. 792,740, dated June 20, 1905.

Application filed July 26, 1904. Serial No. 218,195.

*To all whom it may concern:*

Be it known that I, PETER N. STAFF, a citizen of the United States, residing at Terre Haute, in the county of Vigo and State of Indiana, have invented certain new and useful Improvements in Pipe-Couplings; and I do hereby declare the following to be a full, clear, and exact description of the invention, such as will enable others skilled in the art to which it appertains to make and use the same.

This invention relates to means for coupling together pipe-sections; and it consists in the novel construction and combination of the parts hereinafter fully described and claimed.

In the drawings, Figure 1 is a side view of two pipe-sections, showing the coupling in section. Fig. 2 is an end view of one pipe-section. Fig. 3 is also an end view, but looking at the opposite end of the pipe-section.

A represents pipe-sections used to form pipes for any purpose, such as for water, steam, sewerage, or any other purpose. These pipe-sections may be constructed on any approved material; but cast metal is preferred.

At one end each pipe-section A has a tapering portion B, a rounded end C, and a circumferential groove $c$ close behind the said rounded end. E represents inclined or spiral projections near the said tapering portion B. At the other end each pipe-section A has a socket F. This socket is also tapered; but it may be cylindrical, as shown at F', if desired. This socket has a rounded seat G at its bottom, and H represents inclined or spiral projections which project within the socket at its larger end. The pipe-sections are also preferably provided with external projections I to aid in placing them in engagement with each other; but these external projections may be omitted or any other means may be provided to enable the operator to obtain a secure hold on the pipe-sections.

J is fibrous or yielding packing material, such as oakum, which is wound upon the tapering end portion $b$. The tapering end portion B is then thrust into the socket F and the pipe-sections are turned so that the spiral projections engage with each other. The yielding packing material is compressed until the rounded end bears hard against the rounded seat and forms a tight joint.

When the pipe-sections are to be permanently united, a lead packing K is provided. The lead is melted and is poured around the pipe in the usual manner of making a lead joint and is compressed by turning one of the pipe-sections.

What I claim is—

In a pipe-coupling, the combination, with a pipe-section provided with a socket having spiral projections at its open end; of a pipe-section having a circumferential groove in one end portion, spiral projections which engage with the aforesaid projections of the socket, and a conical portion between the said groove and spiral projections; and yielding packing material around the said conical portion between it and the said socket, said packing material being expanded radially against the periphery of the said socket when one pipe is revolved so as to move it longitudinally toward the other pipe.

In testimony whereof I have affixed my signature in the presence of two witnesses.

PETER N. STAFF.

Witnesses:
JAMES T. LANGHEAD,
ALBERT CATLIN.